June 5, 1923.
J. F. O'CONNOR
HIGH CAPACITY SPRING
Filed Jan. 31, 1921
1,457,931
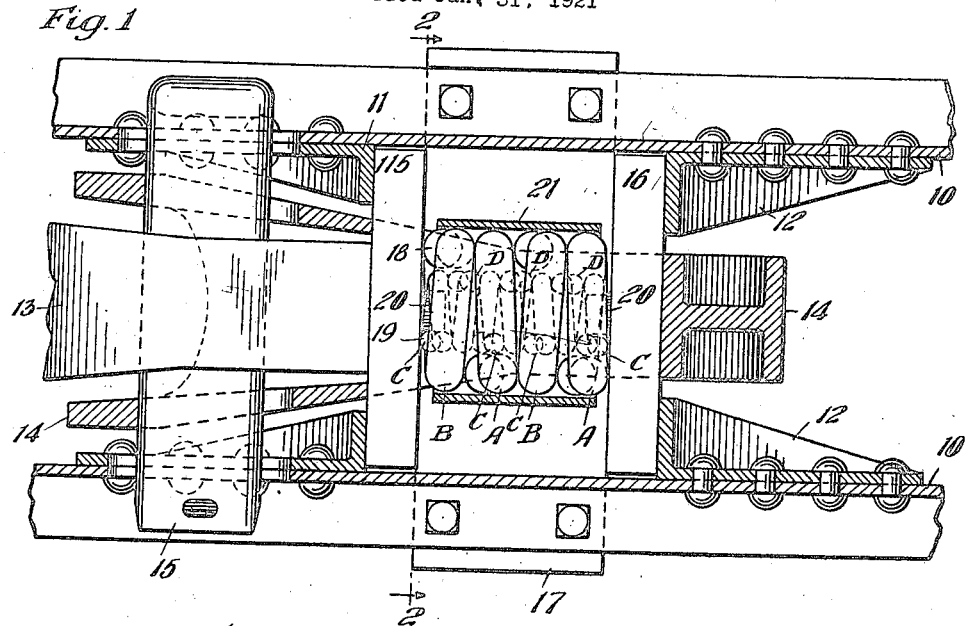
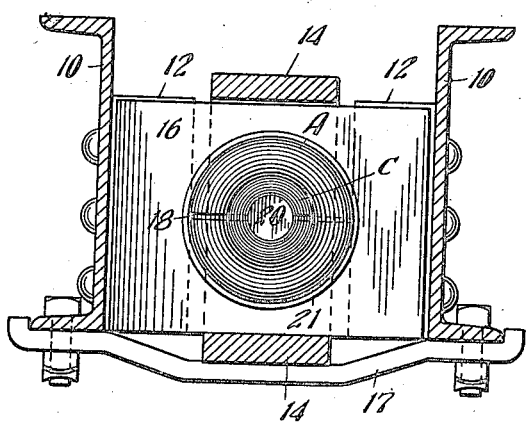
Witnesses
Wm. Geiger
Inventor
John F. O'Connor
By Geo. I. Haight
His Atty.

Patented June 5, 1923.

1,457,931

UNITED STATES PATENT OFFICE.

JOHN F. O'CONNOR, OF CHICAGO, ILLINOIS, ASSIGNOR TO WILLIAM H. MINER, OF CHAZY, NEW YORK.

HIGH-CAPACITY SPRING.

Application filed January 31, 1921. Serial No. 441,128.

*To all whom it may concern:*

Be it known that I, JOHN F. O'CONNOR, a citizen of the United States, residing at Chicago, in the county of Cook and State of Illinois, have invented a certain new and useful Improvement in High-Capacity Springs, of which the following is a full, clear, concise, and exact description, reference being had to the accompanying drawings, forming a part of this specification.

This invention relates to improvements in high capacity springs.

In shock absorbing devices of high capacity, as for instance, railway draft riggings, it is the general practice to employ either alone or in combination with friction creating elements, a heavy spring. Heretofore, these springs, which are made of relatively large diameter rods, have been formed at their ends with so-called tapered flanges in order to provide flat bearing seats at the ends of the spring. In manufacturing such springs, it is first necessary that the ends of the rod before coiling be hammered or forged to provide the tapered tangs and in coiling the rods, the forward ends must first be clamped in proper position and the rear ends of the rods held by tongs in the hands of the operator who is required to exert great strength in preventing the rods from twisting to insure that the rear tang retains its proper position in the finished coiled spring. Experience has shown that much waste is entailed in manufacturing springs of this character due to the human element entering into the coiling thereof, the operators frequently becoming fatigued after a few hours' work and unable to maintain the position of the rear tang with the result that many of the coils must either be rejected or subsequently ground to provide the flat bearings.

It is also a well known fact that in the ordinary helically coiled spring, the capacity of a spring having a plurality of continuous coils is no greater than that of a single turn or coil of 360°, assuming the same diameters of rods, same pitch and same diameters of the coils. Where such springs of multiple continuous coils are employed in a friction draft gear, for instance, the total capacity of the spring provides only a relatively small proportion of the total capacity of the friction draft gear, the major portion of the capacity being necessarily imposed upon the friction elements. Furthermore, where such springs are employed without friction elements in draft gears, the capacities are limited because of the small space allowed for the draft gears on railway cars.

One object of my invention is to provide a spring of high capacity, suitable for use either alone or in combination with friction elements in draft gears or the like wherein the total capacity of the spring is several times that of a continuous helically coiled spring of similar material, same diameter rod and same coil diameter, the arrangement being also such that the total movement or compression stroke of the spring may be made two or more times that of the movement of an individual coil.

More specifically, the object of my invention is to provide a high capacity spring composed of a plurality of independent single turn coils, each having squared off ends and wherein the total capacity is a multiple of the capacity of each individual coil.

In the drawing forming a part of this specification, I have illustrated my improvements in connection with a railway draft rigging and in said drawing, Figure 1 is a horizontal, longitudinal, sectional view of a portion of a railway draft rigging showing my improvements in connection therewith, all of the parts being shown in normal or full release position. Figure 2 is a vertical, transverse, sectional view corresponding substantially to the line 2—2 of Figure 1. Figure 3 is an elevational view of one of the coil units of the outer spring illustrated in Figures 1 and 2. And Figure 4 is an elevational view of a unit of the smaller nested spring illustrated in Figures 1 and 2.

In said drawing, 10—10 denote channel center or draft sills of a railway car to the inner faces of which are secured front stop lugs 11—11 and rear stop lugs 12—12. The inner or rear portion of a drawbar is indicated at 13, the latter being operatively associated with the shock absorbing mechanism proper by means of a hooded cast yoke 14 and coupler key 15. As customary in the draft rigging art, I employ a front main follower 115 and a rear main follower 16 within the yoke and between which is interposed my improved spring. The yoke, followers and spring are adapted to be supported in operative position by means of a detachable saddle plate 17 secured to the lower flanges of the draft sills.

In carrying out my invention, I preferably employ an outer series of units and an inner nested lighter series of units. In the embodiment shown, in the outer series I employ four units, two of which are referenced A—A and two of which are referenced B—B. In the inner series I employ seven units, four of which are referenced C—C and three of which are referenced D—D.

Each of the coil units A is preferably made of the same diameter rod, same pitch and same coil diameter but the two units A—A are coiled righthanded and the two units B are coiled lefthanded, the units A being alternated with the units B. In the case of the inner series, the units C and D are also of like pitch, like coil diameter and like rod diameter but the units C are made with righthanded turns and the units D with lefthanded turns, the units C being alternated with the units D. Each of the units A and B extends thru an arc of approximately 360° and the ends thereof are formed or sawed off square or perpendicular to the axis of the rod as indicated at 18—18. The same is true of the ends 19—19 of each of the inner units.

The pitch of the inner coil units is made steeper than that of the outer coil units so that the offset, axially, of the ends of each inner unit will approximately equal the offset of the ends of each outer unit whereby the compression stroke will be the same for both series.

By employing four coil units and alternating the coil units left and right like the units A, B, A, B, as shown, the helix of the first coil is disposed approximately parallel to that of the third coil and the helix of the second coil is disposed approximately parallel to that of the fourth coil. During compression the four coils will be gradually flattened out and the capacity of each set of coils A, B, will be twice that of a single coil, and the movement obtained will be equal to that of a single coil, while the movement obtained in the two sets of coils A, B, will be twice that of a single coil unit while the capacity will remain the same, twice that of a single coil. By thus arranging the coils forming the spring, I am enabled to obtain a capacity equal to double that of each coil used and a total movement equal to approximately twice that of each unit. By employing three sets, i. e., six units A and B, three of each kind and arranged as shown in Figure 1, the capacity would remain the same but the movement would be three times that of each unit or three times the movement of a set comprised of one right and one left unit.

In order to insure the spring being maintained in proper relation with respect to the followers, each of the latter is preferably formed with an inwardly extended lug 20 over which the end units of the inner series are seated and an outer cylindrical casing or tube 21 is preferably slipped over the outer series, the length of said casing 21 being less than the normal distance between the followers 15 and 16 in order to permit of the necessary movement thereof.

I have herein shown and described what I now consider the preferred manner of carrying out the invention, but the same is merely illustrative and I contemplate all changes and modifications that come within the scope of the claims appended hereto.

I claim:

1. In a high capacity shock absorbing spring consisting of a plurality of like coil units arranged in abutting relation, said units being both right and left, each coil extending through an arc of 360°.

2. A high capacity shock absorbing spring, consisting of a plurality of separate, individual, both right and left helical coils, adjacent coils being arranged in abutting relation, each coil comprising a cylindrical, spirally wound rod extending through an arc of 360°, the ends of each coil being formed flat in a plane perpendicular to the axis of the coil forming rod.

3. A high capacity shock absorbing spring, consisting of a plurality of separate, individual both right and left helical coils arranged in abutting relation, said coils being substantially identical in cross section and size, each coil extending through an arc of approximately 360°, the right and left coils being alternated.

4. A high capacity shock absorbing spring, consisting of a plurality of separate, individual both right and left helical coils, adjacent coils being arranged in axially aligned and abutting relation, each coil extending through an arc of approximately 360°, and subject to torsion, the right and left coils being alternated, the ends of each coil being formed flat in a plane perpendicular to the axis of the coil forming rod.

5. A high capacity shock absorbing spring consisting of a plurality of separate, individual, helical coils of the same diameter and cross section, the helixes of some of said coils being of opposite pitch to that of the remainder, said coils being disposed axially in abutting relation, each coil extending through an arc of 360°.

6. A high capacity shock absorbing spring consisting of telescoped spring units, each unit composed of a plurality of separate, individual helical coils, the helixes of some of the coils of each unit being of opposite pitch to that of the remainder and the pitch of the coils of the inner unit being greater than the pitch of the coils of the outer unit, the coils of each unit being axially disposed in abutting relation, each individual coil extending through an arc of approximately 360°.

In witness that I claim the foregoing I have hereunto subscribed my name this 25th day of Jan., 1921.

JOHN F. O'CONNOR.

Witnesses:
　CARRIE GAILING,
　UNA C. PERIN.